United States Patent [19]

Hermanutz

[11] 3,750,052

[45] July 31, 1973

[54] ADJUSTABLE FREQUENCY-DEPENDENT EQUALIZER

[75] Inventor: Peter Hermanutz, Schoeckingen, Germany

[73] Assignee: International Standard Electric Corporation, New York, N.Y.

[22] Filed: Nov. 26, 1971

[21] Appl. No.: 202,425

[30] Foreign Application Priority Data

Dec. 11, 1970 Germany.............. P 20 61 119.2

[52] U.S. Cl. ............ 333/28 R, 333/70 R, 333/81 R

[51] Int. Cl. ....... H03h 7/10, H03h 7/14, H01p 1/22

[58] Field of Search .................. 333/28 R, 18, 81 R, 333/70 R, 70 CR

[56] References Cited

UNITED STATES PATENTS

| | | | |
|---|---|---|---|
| 2,109,562 | 3/1938 | Bagnall | 333/28 R X |
| 2,158,978 | 5/1939 | Bowman-Manifold et al. | 333/28 R |
| 2,258,047 | 10/1941 | Collard | 333/28 R |
| 2,304,545 | 12/1942 | Clement | 333/28 R |

*Primary Examiner*—Rudolph V. Rolinec
*Assistant Examiner*—Marvin Nussbaum
*Attorney*—C. Cornell Remsen, Jr., Menotti J. Lombardi Jr. et al.

[57] ABSTRACT

In an adjustable frequency-dependent equalizer for correcting the distortions at the ends of the passband of a filter, which equalizer has an L-, a T- or a bridget T-configuration and comprises a series-resonant circuit, a capacitance is connected in parallel to the inductance of said series-resonant circuit. The two capacitances are varied so that their sum is kept constant.

18 Claims, 19 Drawing Figures

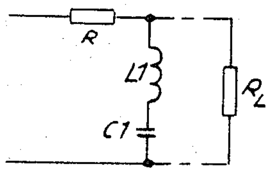
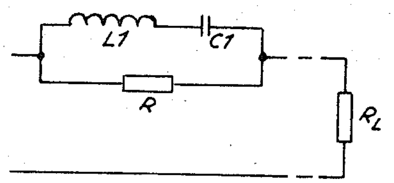
PRIOR ART
FIG. 1a. FIG. 1b.
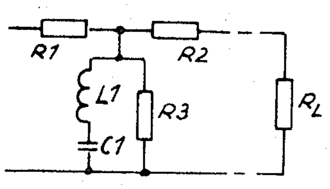
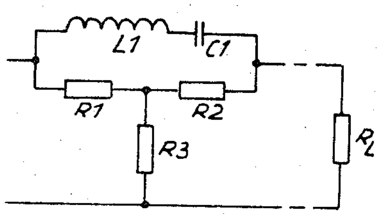
PRIOR ART
FIG. 1C. FIG. 1d.
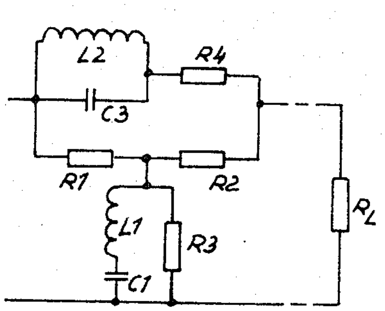
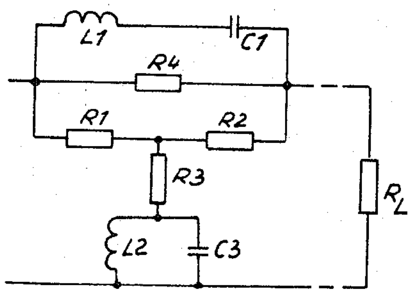
PRIOR ART
FIG 1e. FIG. 1f.
INVENTOR
PETER HERMANUTZ
BY Mark L. Hopkins
AGENT

INVENTOR

PETER HERMANUTZ

BY Mark L. Hopkins

AGENT

INVENTOR

PETER HERMANUTZ

BY Mark L. Hopkins

AGENT

INVENTOR

PETER HERMANUTZ

BY Mark L. Hoglund

AGENT

ADJUSTABLE FREQUENCY-DEPENDENT EQUALIZER

The present invention relates to adjustable frequency-dependent equalizers.

Figure 2A:
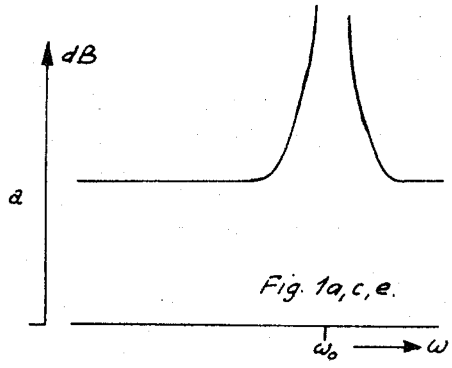
Figure 2B:
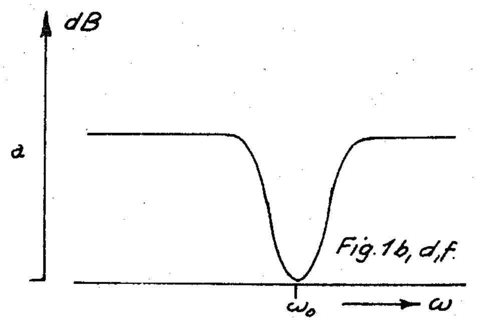

FIGS. 1*a*...*f* show the basic configurations of known frequency-dependent equalizers,which find wide use in communication systems, and FIGS. 2*a* and *b* show the respective attenuation characteristics. FIGS. 1*e* and *f* show a known attenuation equalizer with constant Z. Such attenuation equalizers may be used where certain frequencies or frequency ranges must be raised or lowered with respect to the existing other ones; they also find use if a filter characteristic is to be improved at the limits of the passband, i.e. if the amplitude response resulting from slopes not beginning and/or extending sufficiently steep is to be corrected. In this case, it would be advantageous if the slope steepness of the equalizer used could be adapted by simple means to the respective amplitude response to be corrected. The present invention has for its object to provide such equalizers and the means necessary to adjust their attenuation characteristics.

To attain this object, use is made of a frequency-dependent equalizer consisting of a resistance network in L- or T-configuration in which the resistances of the series branch or the parallel branch are bypassed by a series-resonant circuit. According to the invention, such an equalizer is made adjustable by the fact that a capacitance is connected in parallel to the inductance of the series-resonant circuit, that, for varying the equalizing characteristic, the sharpness of resonance of the series-resonant circuit is adjusted by oppositely-directed variation of the two capacitances, and that, in order to maintain the frequency of the series resonance, the sum of said two capacitances is kept constant. According to a further feature of the invention, a differential trimmer is used for the oppositely directed variation of the two capacitances, with their sum being kept constant. Furthermore, for a quasi-constant-Z equalizer with a series-resonant circuit bypassing the series branch or the parallel branch and with a parallel-resonant circuit inserted in the parallel branch or the series branch, only the bypassing series-resonant circuit is adjusted, while the parallel-resonant circuit is not varied.

Figure 3A:
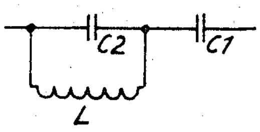
Figure 4A:
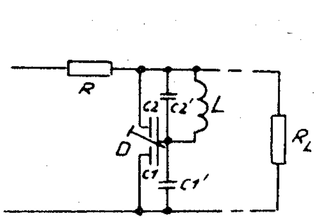
Figure 4B:
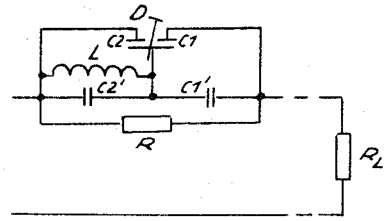
Figure 4C:
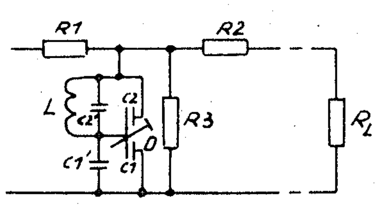
Figure 4D:
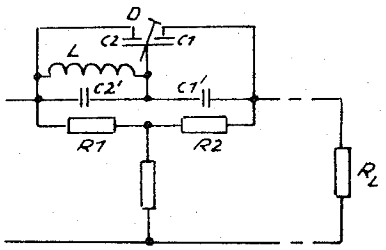
Figure 4E:
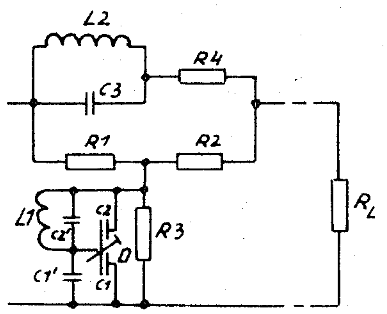
Figure 4F:
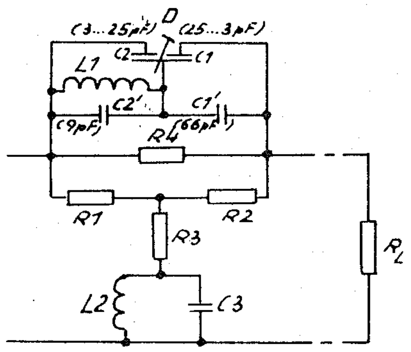
Figure 5:
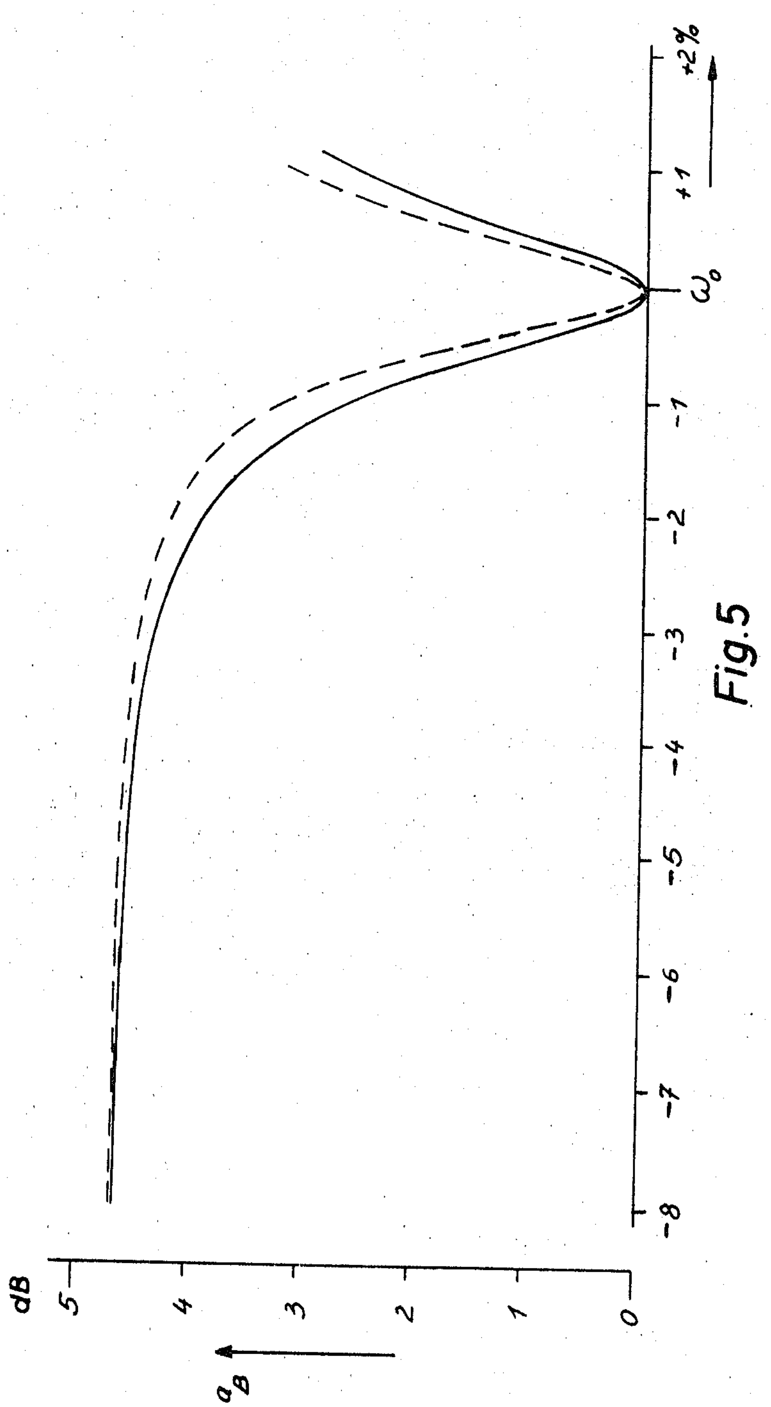

The invention will now be described in detail with reference to the accompanying drawings, in which:

FIGS. 1*a*....*f* show the configurations of known equalizers;

FIGS. 2*a* and *b* show their attenuation characteristics;

FIGS. 3*a*....*d* show the series-resonant circuit used to attain the object of the invention,and its resistance characteristic;

FIGS. 4*a*....*f* show the equalizers according to the invention constructed with said series-resonant circuit, and FIG. 5 shows the attenuation characteristic of an equalizer according to FIG. 4*f* with the attainable adjustment range.

FIGS. 1*a*...*f* show the known frequency-dependent attenuation equalizers mentioned in the introduction. The attenuation equalizers of FIGS. 1*a*...*d* have input and output resistances not constant versus frequency, and FIGS. 1*e* and *f* show constant-Z equalizers. FIGS. 2*a* and *b* illustrate the basic attenuation characteristics. In order to be able to make the attenuation characteristic adjustable in the vicinity of the series resonance of the by-passing series-resonant circuit, we proceed from the comprehension that the resistance characteristic of a two-terminal resonant network having the configuration of FIG. 3*a* can be varied as a function of the capacitances C1 and C2. For such a two-terminal resonant network, $$Z = (1/j\omega\ C\ 1) + /[j\omega\ C\ 2 + (1/j\omega L)] \quad (1)$$

and for the series resonance, $$Z = (1/j\omega_o\ C\ 1) + 1/[j\omega_o\ C\ 2 + (1/j\omega_o\ L)\ ] = 0 \quad (2)$$

Hence, $$\omega_o = 1/\ \sqrt{L\ (C1 + C2)} \quad (3)$$

Figure 3B:
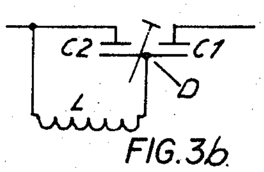
Figure 3C:
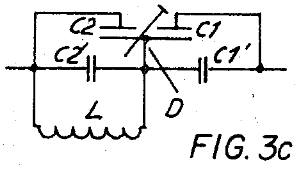
Figure 3D:
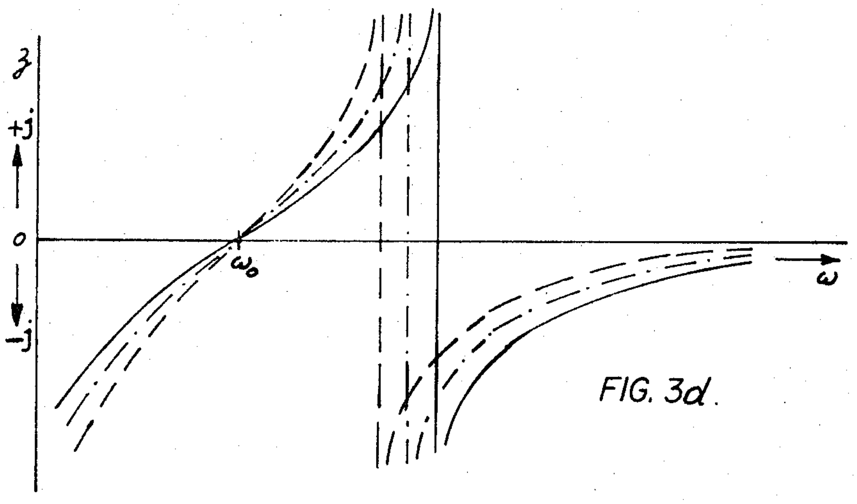

As can be seen from 3, the position of the series resonance of such a two-terminal resonant network does not change as long as the sum of C1 and C2 remains constant. As can be seen from 1, however, the resistance of the two-terminal resonant network versus frequency changes as a function of C1 and C2. If, as illustrated in FIG. 3*b*, C1 and C2 are realized by means of a differential trimmer D, it is insured that the sum of C1 and C2 remains constant (3), while the resistance of the two-terminal resonant network versus frequency changes as a function of the adjusted values of C1 and C2 (1). Thus, without any change in frequency, the sharpness of the series resonance of the two-terminal resonant network can be adjusted. Due to the capacitance C2 connected in parallel to the inductance L, the two-terminal resonant network naturally also has a parallel resonance whose frequency also changes with the variation of the adjustment of the differential trimmer D. For practical applications, use will probably mostly be made of the configuration of FIG. 3*c*, in which fixed capacitors C1′ and C2′ are connected in parallel to the variable capacitance values C1 and C2. The resistance characteristic of such a two-terminal resonant network versus frequency and as a function of the adjustment of the differential trimmer D is shown in FIG. 3*d*. The dash-dotted line is the characteristic at the mid-position of the differential trimmer; the solid line is the characteristic at the smallest parallel capacitance C2 with respect to the inductance, and the broken line is the characteristic at the maximum parallel capacitance C2.

FIGS. 4*a*...*f* show the inventive equalizer configurations resulting from the equalizer configurations of FIGS. 1*a*....*f* if the two-terminal resonant network of FIG. 3 is used. Regarding the use of the two-terminal resonant network, it must be considered that in the useful range the resistance of the two-terminal network which is obtained above the series resonance remains large compared to the bypassed resistance. This condition may limit the use, but for most applications it can be achieved that this is the case only outside the respective useful range. Thus, this limitation must be taken into account for the correction of the transition between the stop bands and passbands of high-pass filters, for the correction at the lower cut-off frequency of a band-pass filter and for that at the upper cut-off frequency of a band-elimination filter. Strictly speaking, if, instead of the simple bypassing series-resonant circuit, a two-terminal resonant network as shown in FIG. 3 is inserted in the equalizer configurations of FIGS. 1*e* and *f*, a variometer would have to be correspondingly inserted in the parallel-resonant circuit for reasons of duality. This, however, would adversely affect the practical applicability of this configuration because the realization of such a variometer is too expensive. The question now arises whether a design as adjustable quasi-constant-Z equalizer is possible at a low expenditure, considering that the realization as constant-Z equalizer is out of the question for reasons of expenditure. It was therefore investigated whether it is possible in such an equalizer to make only the bypassing series-resonant circuit adjustable, while leaving the parallel-resonant circuit unchanged. Can such an equalizer then still be called an adjustable quasi-constant-Z equalizer? These investigations have shown that, at values for the capacitance variation of the two-terminal resonant network as are apparent from FIG. 4*f*, reflection factors are attainable within the adjustment range which are below 5 percent, thus meeting all requirements being imposed on such equalizers. The resonant frequency of the parallel-resonant circuit is equal to the series-resonant frequency of the two-terminal network. Its sharpness of resonance is chosen as the mean value of the actual sharpness of resonance required for the adjustment range, i.e. it roughly corresponds to the geometric mean of the values for the limits of adjustment.

FIG. 5 shows the attenuation characteristic of a practical embodiment of an equalizer as shown in FIG. 4*f*. In accordance with FIG. 3*d*, the solid line shows the attenuation characteristic at the minimum of the parallel capacitance $C2 + C2'$, and the broken line shows the attenuation characteristic at the maximum of $C2 + C2'$. The resonant frequency is designated $\omega_o$, the percentage deviation from this frequency being plotted as frequency measure.

What is claimed is:

1. In an adjustable frequency-dependent equalizer, having a resistance network of L configuration in which the resistance of the series branch portion of the configuration is bypassed by a series-resonant circuit which includes a main inductance and a main capacitance, the arrangement comprising a first capacitance element portion having provision for capacitance variation and coupled in parallel to said main inductance, and a second capacitance element portion coupled relative to said main capacitance to provide capacitance variation, said first and second capacitance portions being arranged to be interrelated such that the sum of the two variable capacitances remains constant in order to maintain the frequency of the series resonance, said first and second variable capacitances being also arranged for oppositely-directed variations and the equalizing characteristic of the equalizer is thus varied by adjusting the sharpness of resonance of the series resonant circuit.

2. The arrangement according to claim 1 wherein said second capacitance portion replaces said main capacitance of the series resonant circuit.

3. The arrangement according to claim 2 wherein a differential trimmer is provided for effecting the oppositely-directed variations of said two variable capacitance portions.

4. The arrangement according to claim 1 wherein said first capacitance includes a fixed capacitance coupled in parallel to said main inductance and a variable capacitance coupled in parallel to said fixed capacitance and to said main inductance, and wherein said second capacitance portion is a variable capacitance, predeterminably variable relative to said variable capacitance in parallel with said main inductance, and coupled in parallel to said main capacitance of said series resonant circuit.

5. In an adjustable frequency-dependent equalizer, having a resistance network of L configuration in which the resistance of the parallel branch portion of the configuration is bypassed by a series-resonant circuit which includes a main inductance and a main capacitance, the arrangement comprising a first capacitance element portion having provision for capacitance variation and coupled in parallel to said main inductance and a second capacitance element portion coupled relative to said main capacitance to provide capacitance variation, said first and second capacitance portions being arranged to be interrelated such that the sum of the two variable capacitances remains constant in order to maintain the frequency of the series resonance, said first and second variable capacitances being also arranged for oppositely-directed variations and the equalizing characteristic of the equalizer is thus varied by adjusting the sharpness of resonance of the series resonant circuit.

6. The arrangement according to claim 5 wherein said second capacitance portion replaces said main capacitance of the series resonant circuit.

7. The arrangement according to claim 6 wherein a differential trimmer is provided for effecting the oppositely-directed variations of said two variable capacitance portions.

8. The arrangement according to claim 5 wherein said first capacitance includes a fixed capacitance coupled in parallel to said main inductance and a variable capacitance coupled in parallel to said fixed capacitance and to said main inductance, and wherein said second capacitance portion is a variable capacitance, predeterminably variable relative to said variable capacitance in parallel with said main inductance, and coupled in parallel to said main capacitance of said series resonant circuit.

9. In an adjustable frequency-dependent equalizer, having a resistance network of T configuration in which the resistance of the series branch portion of the configuration is bypassed by a series-resonant circuit which includes a main inductance and a main capacitance, the arrangement comprising a first capacitance element portion having provision for capacitance variation and coupled in parallel to said main inductance, and a second capacitance element portion coupled relative to said main capacitance to provide capacitance variation, said first and second capacitance portions being arranged to be interrelated such that the sum of the two variable capacitances remains constant in order to maintain the frequency of the series resonance, said first and second variable capacitances being also arranged for oppositely-directed variations and the equalizing characteristic of the equalizer is thus varied by adjusting the sharpness of resonance of the series resonant circuit.

10. The arrangement according to claim 9 wherein said second capacitance portion replaces said main capacitance of the series resonant circuit.

11. The arrangement according to claim 10 wherein a differential trimmer is provided for effecting the oppositely-directed variations of said two variable capacitance portions.

12. The arrangement according to claim 9 wherein said first capacitance includes a fixed capacitance coupled in parallel to said main inductance and a variable capacitance coupled in parallel to said fixed capacitance and to said main inductance, and wherein said second capacitance portion is a variable capacitance, predeterminably variable relative to said variable capacitance in parallel with said main inductance, and coupled in parallel to said main capacitance of said series resonant circuit.

13. The arrangement according to claim 9 wherein the equalizer circuit is a quasi-constant-Z equalizer of T configuration having a series resonant circuit bypassing the series branch portion of the configuration, and a parallel-resonant circuit in the parallel branch portion of the configuration, and wherein the parallel-resonant circuit is kept invariable, with the bypassing series resonant circuit arrangement being variable only.

14. In an adjustable frequency-dependent equalizer, having a resistance network of T configuration in which the resistance of the parallel branch portion of the configuration is bypassed by a series-resonant circuit which includes a main inductance and a main capacitance, the arrangement comprising a first capacitance element portion having provision for capacitance variation and coupled in parallel to said main inductance, and a second capacitance element portion coupled relative to said main capacitance to provide capacitance variation, said first and second capacitance portions being arranged to be interrelated such that the sum of the two variable capacitances remains constant in order to maintain the frequency of the series resonance, said first and second variable capacitances being also arranged for oppositely-directed variations and the equalizing characteristic of the equalizer is thus varied by adjusting the sharpness of resonance of the series resonant circuit.

15. The arrangement according to claim 14 wherein said second capacitance portion replaces said main capacitance of the series resonant circuit.

16. The arrangement according to claim 15 wherein a differential trimmer is provided for effecting the oppositely-directed variations of said two variable capacitance portions.

17. The arrangement according to claim 14 wherein said first capacitance includes a fixed capacitance coupled in parallel to said main inductance and a variable capacitance coupled in parallel to said fixed capacitance and to said main inductance, and wherein said second capacitance portion is a variable capacitance, predeterminably variable relative to said variable capacitance in parallel with said main inductance, and coupled in parallel to said main capacitance of said series resonant circuit.

18. The arrangement according to claim 4 wherein the equalizer circuit is a quasi-constant-Z equalizer of T configuration having a series resonant circuit bypassing the parallel branch portion of the configuration, and a parallel-resonant circuit in the series branch portion of the configuration, and wherein the parallel-resonant circuit is kept invariable, with the bypassing series resonant circuit arrangement being variable only.

* * * * *